UNITED STATES PATENT OFFICE.

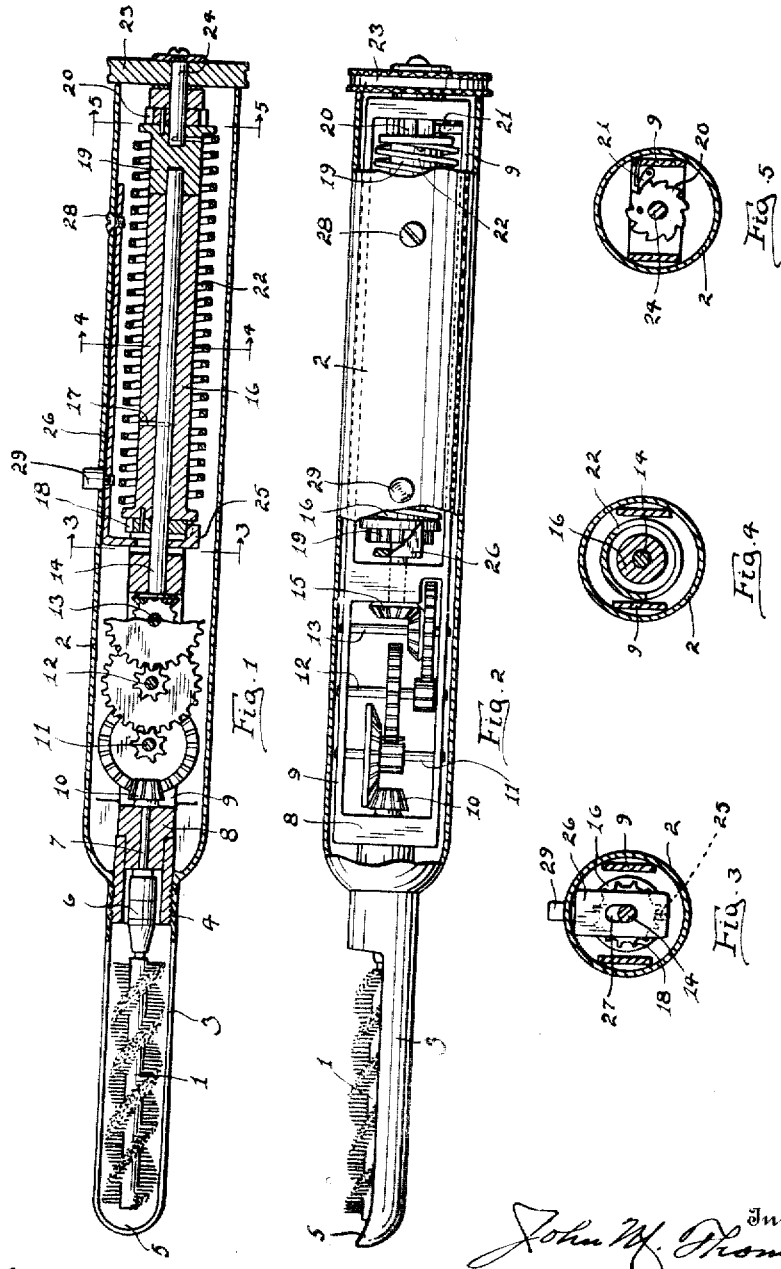
J. M. THOMAS.
MOTOR MECHANISM.
APPLICATION FILED APR. 12, 1917.
1,283,599.
Patented Nov. 5, 1918.

JOHN M. THOMAS, OF COLUMBUS, OHIO.

MOTOR MECHANISM.

1,283,599.

Specification of Letters Patent.  Patented Nov. 5, 1918.

Application filed April 12, 1917.  Serial No. 161,407.

*To all whom it may concern:*

Be it known that I, JOHN M. THOMAS, a citizen of the United States, residing at Columbus, in the county of Franklin and State of Ohio, have invented certain new and useful Improvements in Motor Mechanism, of which the following is a specification.

This invention relates to a motor mechanism and is designed particularly for use in connection with tooth brushes or the like although the structure is not specifically limited thereto. The main object of the invention resides in the mechanism and structure which is preferably confined within the handle portion, in the case of a brush, for giving proper rotation to the brush. This mechanism is also preferably designed to be capable of being wound and set in motion from the exterior of the handle thus rendering its use comparatively easy. Other objects and advantages of the invention will be more apparent from the detail description as the specification proceeds.

The preferred embodiment of my invention is shown in the accompanying sheet of drawings, in which similar characters of reference desigate corresponding parts, and in which Figure 1 is a longitudinal section taken through my improved type of tooth brush, Fig. 2 is a view partially in elevation and partially in section taken at right angles to that shown in Fig. 1, and Figs. 3, 4 and 5 are cross sections taken respectively on lines 3—3, 4—4 and 5—5 of Fig. 1.

Generally speaking, my invention consists of a brush portion 1 and a handle portion 2. All of the mechanism for causing rotation of the brush is confined within the handle 2 and in addition, there is secured a guard member 3 to this handle portion. This guard member is threaded onto the rounded end of the handle as is shown at 4 and is cut out to cover substantially half of the brush and also extends longitudinally of the same, terminating in the rounded or beak shaped end 5. The brush portion is preferably removable from its position and is secured to the remainder of the structure by means of the ordinary type of chuck shown at 6. A spindle 7 journaled in the cross piece 8 of the main framework 9, is secured at one end to the chuck 6 and carries the bevel pinion 10 at its opposite end. A series of shafts 11, 12 and 13 are rotatably journaled across this framework 9 and which in turn carry the gear wheels shown particularly in Fig. 2, so that the rate of rotation of the spindle 7 is gradually increased from that of the main drive shaft shown at 14. This drive shaft 14 carries the bevel gear 15 at one end which begins the train of gearing which terminates in the bevel gear 10 and by means of the rotation of this shaft 14, the spindle 7 is also rotated. This shaft 14 is rigidly pinned to a core 16 as is shown at 17, this core being provided with a series of ratchet teeth 18 at its left hand end for a purpose to be presently described. The opposite end of the shaft 14 is rotatably journaled in a second core 19 which also carries a series of ratchet teeth 20 on its right hand end to coöperate with the spring pressed pawl 21 carried by the main framework 9. These core sections 16 and 19 are relatively independent, but it is to these that the opposite ends of the spring motor 22 are secured. On the extreme outer end of the handle 2 there is located a wheel 23 which is rigidly secured to a stub shaft 24. This latter stub shaft is also rigidly secured to the core 19, so that rotation of the wheel 23 causes a corresponding rotation of the core section 19 to correspondingly wind the spring. The opposite end of the core section is normally prevented from rotation by means of the tooth 25 carried by the spring release member shown at 26. This tooth 25 is normally in engagement with one of the ratchet teeth 18 so that this end of the core is prevented from rotation when the parts are in the position shown in Figs. 1 and 3. This spring release member is provided with a slot shown at 27 through which the shaft 14 passes and is then bent at right angles and extends rearwardly within the handle to be rigidly secured in position at its rear end by means of the screw as is shown at 28. This release member also carries a thumb piece 29, which loosely passes through the handle casing in such manner that inward movement thereof causes the tooth 25 to come out of engagement with the ratchet teeth 18, thus permitting rotation of the brush 1 under the influence of the spring 22.

From the foregoing description, it will be apparent that when the parts are in the position shown in Fig. 1, rotation of the wheel 23 causes the spring 22 to be placed under tension. This wheel is prevented from rearward rotation by means of the spring pressed dog shown at 21. When it is desired to use the brush, the thumb piece 29 is pushed, which brings the tooth 25 out of engagement with the ratchet teeth 18, thereby permitting the brush 1 to be rotated at a much greater speed than the shaft 14 because of the train of gearing interposed between these two points.

What I claim is:

A motor mechanism for a rotary tooth brush, comprising a hollow handle member, a drive shaft mounted for rotation within said handle, a core member rotatable with said shaft, a spring having one end thereof connected with said core and surrounding the latter, a second core member also connected with the other end of said spring and serving as a journal support for the rear end of said shaft, ratchet controlled means coöperative with said second core member for effecting the winding of said spring, a toothed wheel fixedly carried by the forward end of said first named core, a manually controlled spring pressure finger coöperative with said toothed wheel to release and arrest the rotation of said shaft, a driven shaft, and speed increasing gears situated between said drive shaft and said driven shaft.

In testimony whereof I affix my signature in presence of two witnesses.

JOHN M. THOMAS.

Witnesses:
 WALTER E. L. BOCK,
 A. L. PHELPS.